United States Patent [19]

Nicholson

[11] Patent Number: 5,433,456
[45] Date of Patent: Jul. 18, 1995

[54] SPRING ENERGIZED CONVOLUTED SURFACE SEAL

[75] Inventor: Timothy P. Nicholson, Cheshire, Conn.

[73] Assignee: The Advanced Products Company, North Haven, Conn.

[21] Appl. No.: 339,653

[22] Filed: Nov. 15, 1994

Related U.S. Application Data

[63] Continuation of Ser. No. 992,693, Dec. 18, 1992, abandoned.

[51] Int. Cl.[6] ............................................. F16J 15/00
[52] U.S. Cl. ........................................ 277/236; 277/164
[58] Field of Search .............. 277/160, 163, 164, 200, 277/207 R, 207 A, 208, 213, 215, 235 R, 236

[56] References Cited

U.S. PATENT DOCUMENTS

| | | |
|---|---|---|
| Re. 32,264 | 10/1986 | Bonafous . |
| 1,818,595 | 8/1931 | Wilsey . |
| 2,761,442 | 9/1956 | Emerson ........................ 277/164 |
| 3,031,213 | 4/1962 | Bruning et al. .................. 277/164 |
| 3,485,142 | 12/1969 | Kutas et al. ..................... 277/160 |
| 3,879,043 | 4/1975 | Tozer ............................. 277/163 |
| 4,194,749 | 3/1980 | Bonafous ....................... 277/163 |
| 4,383,694 | 5/1983 | Fontana . |
| 4,410,189 | 10/1983 | Myers et al. . |
| 4,457,523 | 7/1984 | Halling et al. ................... 277/236 |
| 4,477,057 | 10/1984 | Friess . |
| 4,603,892 | 8/1986 | Abbes et al. .................... 277/236 |

OTHER PUBLICATIONS

EnerRing, Metal-E-Rings, Advanced Products Reference Guide—No date available.
EnerRing; Resilient Metal Seals, Advanced Products Design Manual—No date available.

Primary Examiner—Daniel G. DePumpo
Attorney, Agent, or Firm—Fishman, Dionne & Cantor

[57] ABSTRACT

A metal seal is provided which comprises an annular metal jacket or housing having a convoluted cross-section. The convoluted metal jacket includes at least two convolutions, each of which retains a spring (preferably a coiled helical spring) for reinforcing the jacket when installed under a load. Preferably, the convoluted cross-section is serpentine such that each spring is retained on an opposed surface of the annular jacket relative to an adjacent spring. In a first embodiment of the present invention, the convolutions (and hence the springs retained in each convolution) are aligned with one another. In a second embodiment, the convolutions (and springs retained therein) are offset from one another, preferably in a triangular configuration.

9 Claims, 2 Drawing Sheets

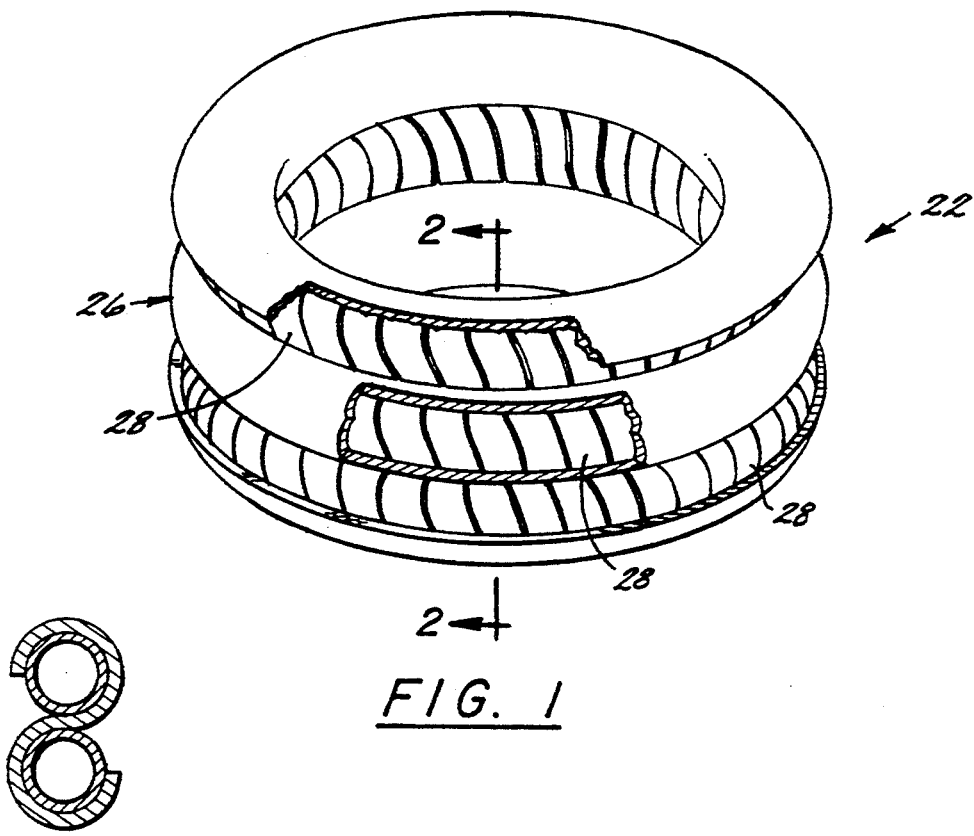
FIG. 1
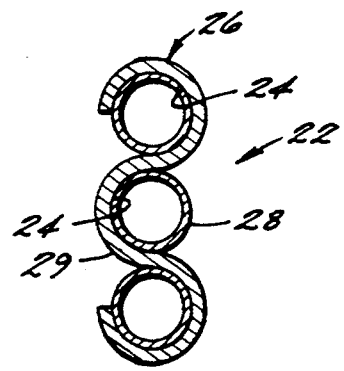
FIG. 2A
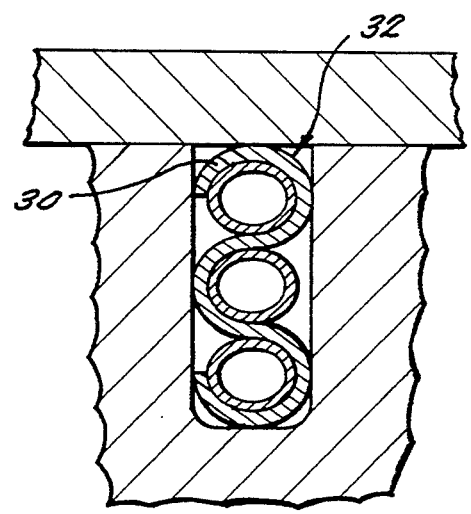
FIG. 2
FIG. 3

SPRING ENERGIZED CONVOLUTED SURFACE SEAL

This is a continuation of application Ser. No. 07/992,693 filed on Dec. 18, 1992 now abandoned.

BACKGROUND OF THE INVENTION

This invention relates generally to metallic resilient seals used primarily for high pressure and/or high temperature sealing applications (e.g., extreme environments). More particularly, this invention relates to metal spring energized seals which contain multiple energizing metal springs retained within a resilient annular metallic jacket having a cross-section with at least two convolutions. One each of these springs is retained by each convolution of the jacket.

Resilient serpentine or convoluted seals are well known in the art. In general such prior art metal seals are comprised of resilient metal capable of high "spring-back". Spring-back is defined as the amount a seal will rebound after the seal has been compressed between sealing cavities or glands. Examples of such resilient convoluted metal seals are represented by the metal seals sold under the trademark Metal-E-Rings by Advanced Products of North Haven, Conn.

However, a major drawback to such well known prior art convoluted seals (i.e., Metal-E-Rings seal) is that although the convoluted seal has very favorable spring-back characteristics, such convoluted seals exhibit a bi-directional pressure ceiling which is quite limited. Also, the prior art convoluted seal has relatively low bearing (i.e., sealing) contact/seating stresses. In addition, the pressure capability of known serpentine seals is quite limited.

A metal seal commonly referred to as a "C-Ring" has a C-shaped cross section. While such C-ring metal seals are excellent for high pressure sealing, these seals unfortunately have low spring-back characteristics. In one variation, a coiled metal spring is provided in the C-shaped jacket to define a spring energized seal. However, while these prior art spring energized seals exhibit improved spring back relative to simple C-ring seals, such spring energized C-shaped seals are problematic in that to achieve the resiliency of the serpentine seal would necessitate the cross/sectional diameter of the seal to be excessively large and in practice, difficult to accommodate (i.e., the seal cavity).

SUMMARY OF THE INVENTION

The above-discussed and other drawbacks and deficiencies of the prior art are overcome or alleviated by the new and improved spring energized metal seal of the present invention. In accordance with the present invention, a metal seal is provided which comprises an annular metal jacket or housing having a convoluted cross-section. The convoluted metal jacket includes at least two convolutions, each of which retains a spring (preferably a coiled helical spring) for reinforcing the jacket when installed under a load. Preferably, the convoluted cross-section is serpentine such that each spring is retained on an opposed surface of the annular jacket relative to an adjacent spring.

In a first embodiment of the present invention, the convolutions (and hence the springs retained in each convolution) are aligned with one another. In a second embodiment, the convolutions (and spring retained therein) are circumferentially offset from one another, preferably in a triangular configuration.

The metal seal of the present invention employing multiple metal springs within a serpentine or convoluted jacket has many features and advantages relative to the prior art non-spring energized "E" or "C" shaped seals. For example, the present invention greatly increases the bi-directional pressure capability of the convoluted surfaced metal seal. In addition, the spring energized seal of this invention has much greater bearing (sealing) contact stresses and exhibits increased "spring-back". The energizing springs retained by each convolution of the convoluted jacket greatly enhance the initial (non-pressurized) contact sealing stresses as well as greatly increasing the seal's ability to withstand increased pressures. The ability to maintain a more effective seal at all times is another result of this invention. This seal is also effective where sealing surface dimensions vary significantly due to changes in temperature, pressure and external forces. Economic savings result from this invention because the new seal increases the bi-directional pressure ceiling and the present invention will therefore be useful in a wider range of applications.

The metal seal of this invention also exhibits advantages and features relative to the spring energized C-shaped metal seals of the prior art. For example, higher spring-back with same radial width.

The above discussed and other features and advantages of the present invention will be appreciated and understood by those skilled in the art from the following detailed description and drawings.

BRIEF DESCRIPTION OF THE DRAWINGS:

Referring now to the drawings, wherein like elements are numbered alike in the several figures:

FIG. 1 is a perspective view of a metal spring energized seal in accordance with the present invention;

FIG. 2 is a cross-sectional elevation view along the line 2—2 of FIG. 1;

FIG. 2A is a cross-sectional elevation view in accordance with an alternate embodiment;

FIG. 3 is a partial cross-sectional elevation view of the metal spring energized seal of FIG. 1 under compression;

Figure 4:
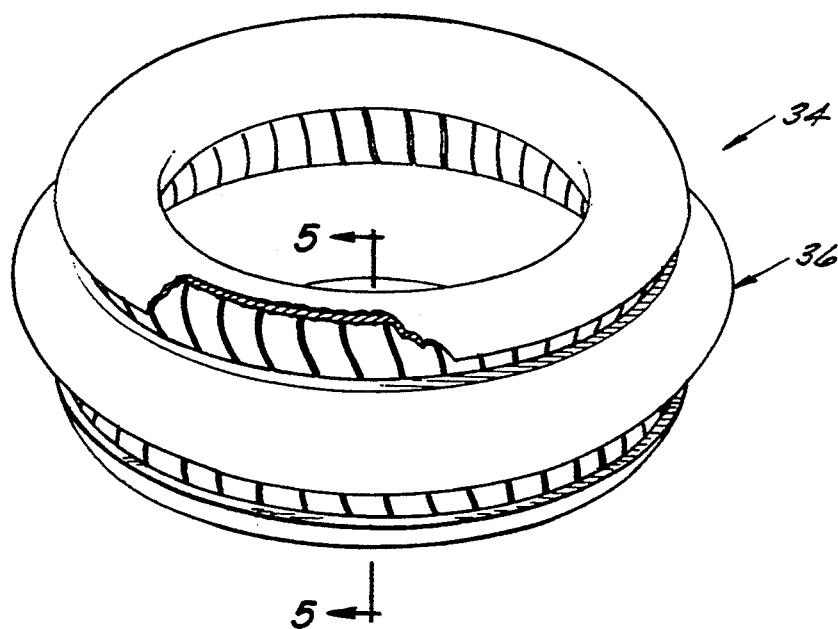
FIG. 4 is a perspective view of an alternative embodiment of a metal spring energized seal in accordance with the present invention.
Figure 5:
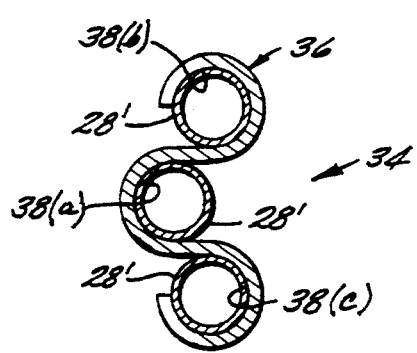
FIG. 5 is a cross-sectional elevation view of the metal spring energized seal along the line 5—5 of FIG. 5.

DESCRIPTION OF THE PREFERRED EMBODIMENT:

Referring to FIGS. 1 and 2, a preferred embodiment of a metal spring energized seal in accordance with the present invention is shown generally at 22. Metal seal 22 comprises an annular metal resilient jacket 26 having a convoluted cross-section and having three sinuous convolutions 24 which partially enclose and retain a multiplicity of metal springs 28. While three convolutions 24 are described herein, it will be appreciated that any number of sinuous convolutions, a minimum of two, may be employed. A metal spring energized seal 22' having two convolutions 24' which partially enclose and retain a multiplicity of metal springs 28' is shown in FIG. 2A. Preferably, springs 28 are helical coiled springs with one spring 28 being retained by each one of the convolutions 24. Each convolution of jacket 26 is dimensioned to receive and retain one of the inner springs 28. Preferably, the convolutions of jacket 26 have a serpentine cross-section so that the outer (i.e., upper and lower springs 28(*b*) and 28(*c*) are positioned on an inner surface 29 which the central spring 28(*a*) is positioned on an outer surface 31. Thus, each spring 28 is positioned on an opposed surface of jacket 26 from an adjacent spring.

Each spring 28 is selected for the proper parameters as required by a particular application. Such parameters include coil diameter, length, material and temper. Similiarly, the metal jacket (serpentine or convoluted shape) 26 is selected for the proper parameters such as dimensions, material, temper and shape to retain the spring 28 in a completed seal assembly. Jacket 26 and spring 28 means comprises for example a corrosion resistent high nickel alloy.

One method of manufacturing the present invention utilizes metal strip of the proper dimensions, material and temper which is welded into a band and roll formed/die formed into the desired shape and dimensions. The springs are positioned within the jacket and final conventional forming operations capture the springs into the jacket.

In the preferred embodiment as shown in FIG. 1, the three springs 28 are aligned with one another. When placed under compression as shown in FIG. 3 in a cavity or gland 30; it can be readily seen that sealing surfaces 32 of convolutions 24 contact surfaces of the cavity or gland 30. In accordance with an important feature of this invention, the spring energized seal of the present invention substantially returns to its original dimensions when the compression load is removed thus exhibiting excellent spring-back characteristics. In this preferred embodiment as shown in FIG. 1, the spring energized metal seal is effective as it is pressure energized in both directions (i.e., bi-directional).

An alternative embodiment of the present invention is shown in FIG. 4 generally at 34. As in the FIG. 1 embodiment, seal 34 includes a jacket 36 having a convoluted or serpentine configuration defining at least three convolutions 38 for retaining a metal spring 28'. However, in contrast to the FIG. 1 embodiment, at least one convolution 38 is canted or circumferentially offset from the others. In a preferred embodiment, the central convolution 38(*a*) is circumferentially offset from the two outer convolutions 38(*b*) and 38(*c*) so that convolutions 38(*b*) and 38(*c*) remain mutually aligned and all three convolutions have an overall triangular shape. As a result, each spring 28' is canted or circumferentially offset to each adjacent spring.

Figure 6:
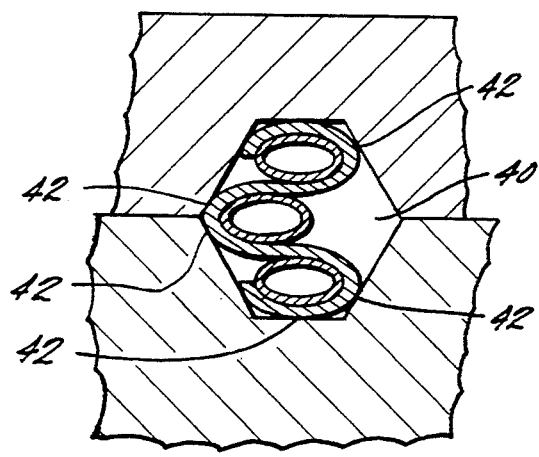
FIG. 6 is a partial cross-sectional elevation view of the metal spring energized seal of FIG. 4 under compression.

Referring to FIG. 6, a typical hexagonally shaped sealing cavity or gland 40 is shown with a metal seal 34 in accordance with the second embodiment of this invention inserted therein. Metal seal 34 is depicted after compression with jacket 36 and springs 38 being resiliently deformed. As in the first embodiment, the excellent spring-back feature of seal 34 will allow the seal to substantially regain its shape when the compression load is removed. The offset feature of this second embodiment forces the seal 34 to buckle in the desired direction, when under compression, to effect a completely supported seal. This design is particularly useful in an API (American Petroleum Institute) hexagonal or oval ring-joint groove application. Note that sealing engagement is achieved by compressed seal 34 at six (6) locations 42.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A metal seal comprising:
   an annular resilient metal jacket having a first surface and a second surface, said metal jacket having a cross section which includes at least two sinuous convolutions; and
   at least one metal spring on each of said first and second surfaces, wherein the springs are substantially contained within said convolutions on each of said first and second surfaces of said metal jacket.

2. The seal of claim 1 wherein:
   each of said convolutions and metal springs are circumferentially aligned with one another.

3. The seal of claim 1 wherein:
   at least one of said convolutions is circumferentially offset with respect to at least one other of said convolutions.

4. The seal of claim 3 wherein the jacket has two outer convolutions relative to one central convolution and wherein:
   said two outer convolutions are circumferentially aligned and said central convolution is offset with respect to said outer convolutions.

5. The seal of claim 1 wherein:
   said spring comprises a helical coiled spring.

6. The seal of claim 1 wherein:
   said jacket has a serpentine cross-section wherein each of said springs are positioned on an opposed surface of said jacket relative to an adjacent spring.

7. The seal of claim 6 wherein:
   each of said convolutions and metal springs are circumferentially aligned with one another.

8. The seal of claim 6 wherein:
   at least one of said convolutions is circumferentially offset with respect to other convolutions.

9. The seal of claim 8 wherein the jacket has two outer convolutions relative to one central convolution and wherein:
   said two outer convolutions are circumferentially aligned and said central convolution is circumferentially offset with respect to said outer convolutions.

* * * * *